July 14, 1970   M. G. AALPOEL   3,520,106
DEVICE TO SQUEEZE FLAT AND TO WELD TOGETHER THE PROJECTING
TUBULAR PORTIONS OF A SHEET OF THERMOPLASTIC WRAPPING
MATERIAL WOUND AROUND A CIGAR
Filed March 7, 1968
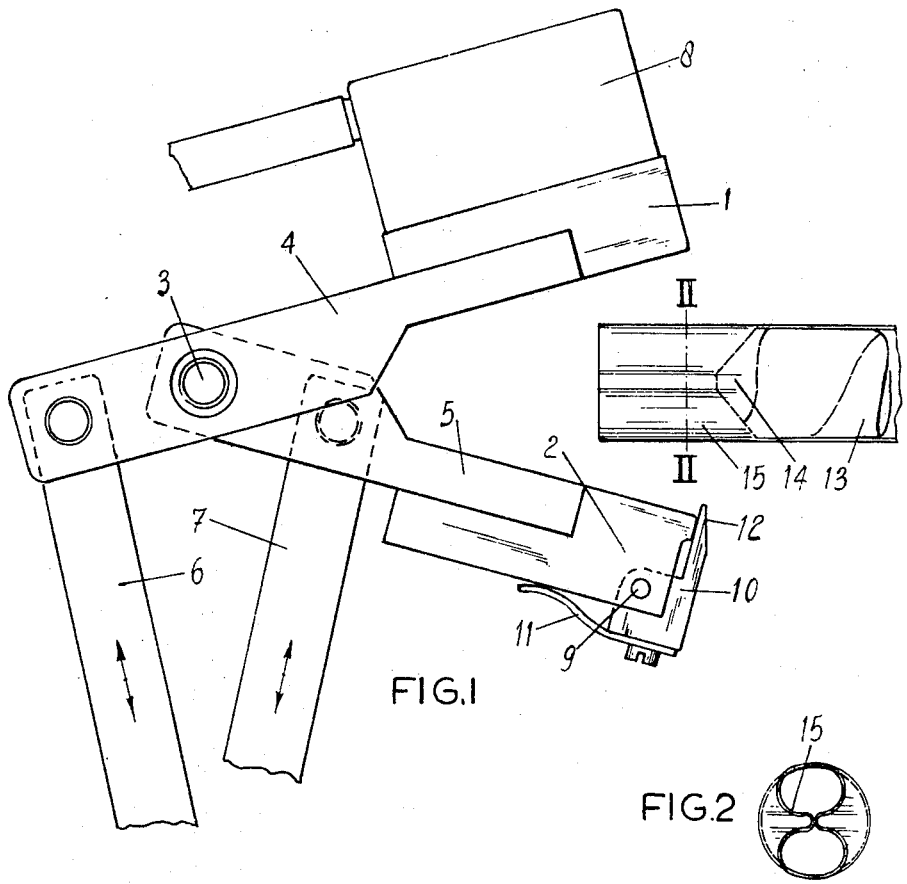
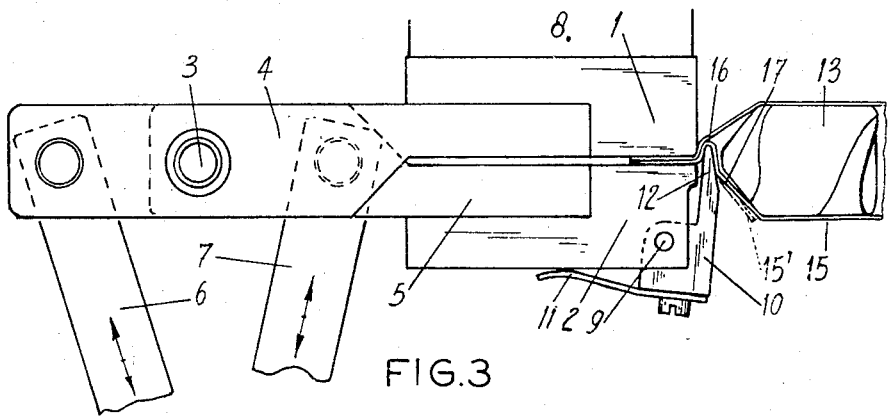
INVENTOR
MARTEN G. AALPOEL United States Patent Office 3,520,106
Patented July 14, 1970

3,520,106
DEVICE TO SQUEEZE FLAT AND TO WELD TOGETHER THE PROJECTING TUBULAR PORTIONS OF A SHEET OF THERMOPLASTIC WRAPPING MATERIAL WOUND AROUND A CIGAR
Marten G. Aalpoel, Neunen, Netherlands, assignor to Patent Machine Bouw N.V., Best, Netherlands, a company of the Netherlands
Filed Mar. 7, 1968, Ser. No. 711,298
Claims priority, application Netherlands, Mar. 29, 1967, 6704453
Int. Cl. B65b 7/06, 51/30
U.S. Cl. 53—373    2 Claims

ABSTRACT OF THE DISCLOSURE

The invention relates to a device in the form of a pair of tongs to squeeze flat and to weld a sheet of thermoplastic wrapping material wound around a cigar, the tubular portion projecting from the spherical or conical end of said cigar and being deformed by a folding device. One of the jaws of said pair of tongs is provided with a heating element and one of said jaws carries a movable tansverse rib which, in the closed position of the tongs, lies beyond the free end of the other jaw and extends over the end face of the latter.

BACKGROUND OF THE INVENTION

A device of this kind is disclosed in the Dutch patent specification 90,863. In this device the rib is formed by a plate member which is attached to the end face of the lower jaw and extends beyond the pressing surface of said jaw. This device is well adapted for handling thermoplastic substances, such as cellophane, but not suitable for handling thermoplastic substances, such as polypropylene. It has been found after extensive research that the welding of the wrapper provided around the cigar depends both upon the temperature and the exerted pressure at the welding spot. With substances, such as polypropylene, for which the tolerances of temperature and pressure for the welding operation are small, a pair of tongs of known structure presents difficulties. Too often either the welded seam is not sufficiently tight or the material of the wrapper melts at the welding spot.

SUMMARY OF THE INVENTION

The invention provides a device in the form of a pair of tongs for the mentioned objective which can be used for welding the wrappers of cigars, irrespective of the thermoplastic material from which said wrappers are made, and which can be mounted in place of the pair of tongs provided in existing devices for folding and welding the wrappers wound around cigars. In the invention, said transverse rib is formed on a block which is movably connected to the relevant jaw and is loaded by a spring which forces said block with its transverse rib towards the jaws. Preferably the block provided with the transverse rib is connected for rotation about a transverse axis with respect to the relevant jaw of the pair of tongs. If a device of this new construction is used, wrappers of thermoplastic material wound around cigars can be successfully welded repeatedly in the required manner.

BRIEF DESCRIPTION OF THE DRAWINGS

FIG. 1 is an elevational view of the device in the form of a pair of tongs according to the invention in open position,
FIG. 2 is a cross sectional view along the line II—II in FIG. 1 of a pretreated wrapper wound around a cigar, and
FIG. 3 is an elevational view of a part of said pair of tongs in closed position.

DESCRIPTION OF THE PREFERRED EMBODIMENT

In the drawing 1 and 2 are the jaws of a pair of tongs which are attached to arms 4, 5 mounted for rotation about an axis 3 and adapted to be operated by rods 6, 7. A heating element 8 is mounted on jaw 1 and jaw 2 carries, at its free end, a block 10 which is adapted to swing about a transverse axis 9 and is loaded by a spring 11. Formed on block 10 is an transverse rib 12 which, in the closed position of the pair of tongs, lies beyond free end of the jaw 1 and extends over the end face of the jaw 1 (see FIG. 3). The spring 11 forces the block 10 provided with the transverse rib 12 towards the end faces of jaws 1, 2.

In a wrapping machine (not shown), a cigar 13 having a spherical or conical end portion 14 is wrapped in a sheet of wrapping material 15, e.g. polypropylene, and said cigar is placed with the tubular portion of the wrapper projecting from said end of the cigar in a folding and welding device only the welding tongs of which are illustrated in the drawing. In said device the tubular end portion of the wrapper is first formed by fingers so as to give said end portion the cross-sectional shape of an 8 (see FIG. 2). Thereupon said end portion is squeezed flat and welded in the vertical direction of said 8-shape by a pair of tongs according to the invention (FIG. 3). After this has been done, the flat end portion of the wrapper is folded back about the fold 16 formed by the transverse rib 12 and then pressed against the oblique surface 17 of the wrapper 15, where said portion is locally fixed by welding (see the folded back end portion 15' of the wrapper shown in dotted lines). This folding back operation is not shown.

What I claim is:
1. A pair of tongs to flatten and to seal by fusing the protruding free end portion of a tubular sleeve of thermoplastic sheet material, said pair of tongs comprising two jaws which are adapted to be moved towards and away from each other, at least one heating element associated with one of said jaws, a block moveably connected to one of said jaws, a nose formed on said block and extending over the end face of the jaw to which the block is connected and over a part of the end face of the other jaw when the pair of tongs is in its closed position, said block being moveable in such a manner that its nose is adapted to be moved from a position spaced from the end faces of said jaws towards said end faces, and resilient means acting on said block and forcing said nose towards said end faces.
2. A pair of tongs as claimed in claim 1, including means pivotally connecting said block to said one of said jaws for angular movement about an axis extending transversely to said one jaw.

References Cited
UNITED STATES PATENTS
2,691,474  10/1954  Olson _____ 53—373 X FOREIGN PATENTS
1,015,971  10/1952  France.

THERON E. CONDON, Primary Examiner
R. L. SPRUILL, Assistant Examiner

U.S. Cl. X.R.
53—379